July 13, 1965     GERHARD-GÜNTER GASSMANN     3,194,971
CIRCUIT FOR PRODUCING A DIRECT VOLTAGE AS A FUNCTION OF THE
PHASE DIFFERENCE BETWEEN TWO A.C. VOLTAGES
Filed March 30, 1960                          5 Sheets-Sheet 1

INVENTOR
GERHARD-GUNTHER GASSMANN
BY
ATTORNEY

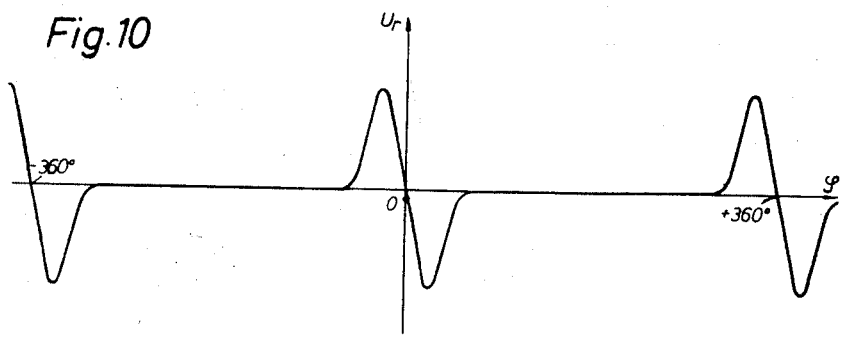
Fig. 10
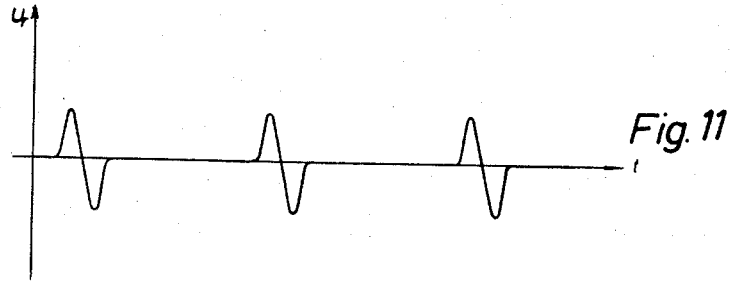
Fig. 11
Fig. 12
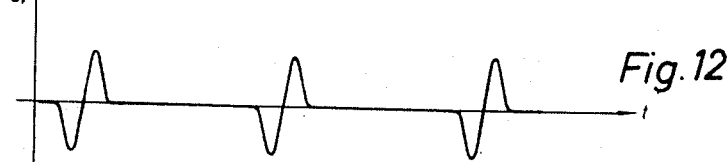
Fig. 13
Fig. 14
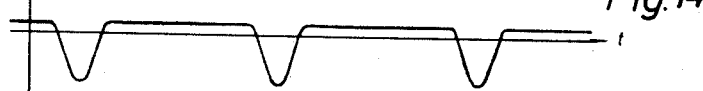

United States Patent Office 3,194,971
Patented July 13, 1965

3,194,971
CIRCUIT FOR PRODUCING A DIRECT VOLTAGE AS A FUNCTION OF THE PHASE DIFFERENCE BETWEEN TWO A.C. VOLTAGES
Gerhard-Günter Gassmann, Berkheim, Germany, assignor to International Standard Electric Corporation, New York, N.Y., a corporation of Delaware
Filed Mar. 30, 1960, Ser. No. 18,710
Claims priority, application Germany, Apr. 4, 1959, St 14,961; Mar. 11, 1960, St 16,224
7 Claims. (Cl. 307—72)

Phase-comparison circuits with two diodes are already known, with the aid of which, from the phase difference between two generally not sinusoidal voltages, a directive voltage is derived which is preferably used for the frequency- or phase-readjusting purposes. Furthermore it has already become known that such types of arrangements can also be used for the demodulation of a frequency-modulated signal, if e.g. with the aid of two oscillating circuits of the same frequency, a network is constructed for supplying two voltages, which are phase-modulated in the rhythm of the modulating frequency (ratio detector, difference detector).

Likewise it is also known that for the rectification of pulse-shaped voltages, instead of a diode, a voltage-dependent resistor can be used as a rectifier. It is a condition for the derivation of a direct voltage with the aid of a voltage-dependent resistor, that the alternating voltage to be rectified, in one direction of polarization, has to have a higher peak value than in the other direction, with respect to the mean value. In the inventive method of producing a directive voltage as a function of the phase difference between two alternating voltages, a polarization-independent non-linear element, preferably a voltage-dependent resistor, not only replaces one, but two diodes. In addition to this economical advantage, the inventive method has the advantage of providing a special circuit-technical simplicity. For example, the two source of alternating voltage may be related to mass.

Another non-linear polarization-independent element is, for example, a symmetrical glow-discharge gap. For instance, when choosing a tubular glow-discharge gap it is even possible to effect an optical reading of the phase relation from the relationship between the lengths of the glow-discharge gaps with respect to one another.

In the inventive method a sum or difference voltage is derived from two alternating voltages, which has such a shape of curve as a function of time, that in the case of the desired phase relation the two voltage-peak values (the negative and the positive one) of this sum or difference voltage, in regard to the mean value, are of equal magnitude, and that in the event of a deviation from this phase relation into the one or the other direction, respectively the one or the other peak value is increased or decreased respectively. This sum or difference voltage, whose shape of curve with respect to time is a function of the phase difference of the two individual voltages, is fed to the non-linear, polarization-independent element for the rectification purpose. The thus obtained direct voltage is the desired (or wanted) phase-dependent directive voltage.

Several embodiments are illustrated by way of example in the various figures wherein.

Figure 9:
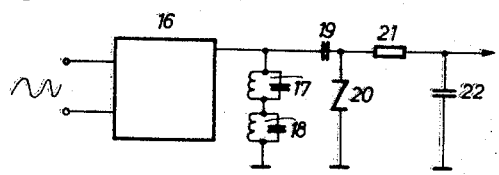
Figure 6:
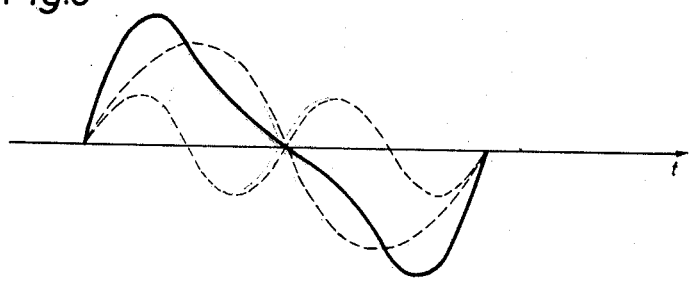
Figure 7:
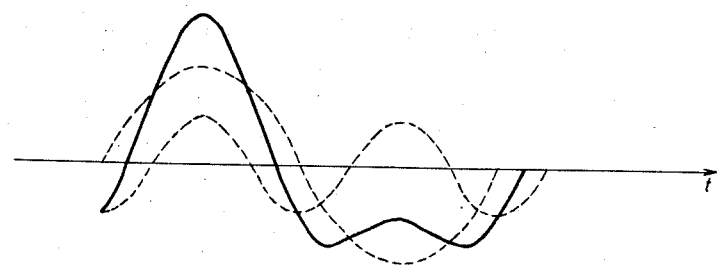
Figure 8:
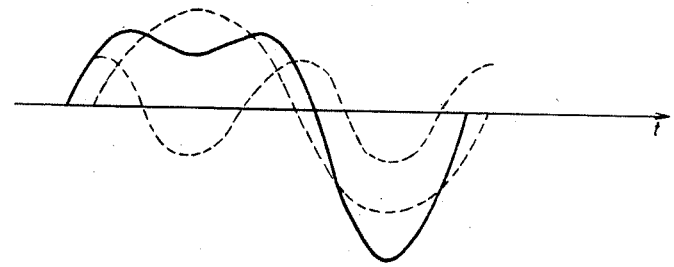
Figure 15:
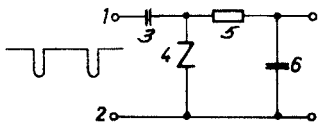
Figure 16:
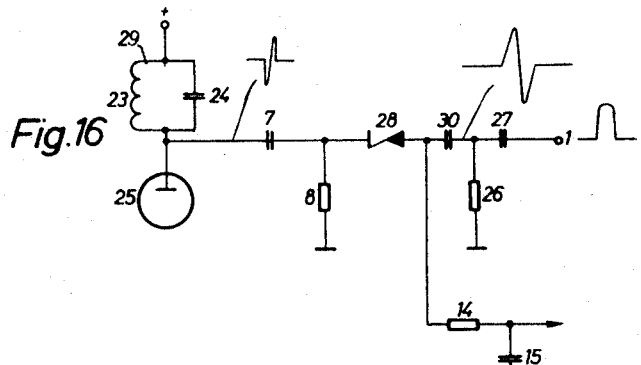
Figure 17:
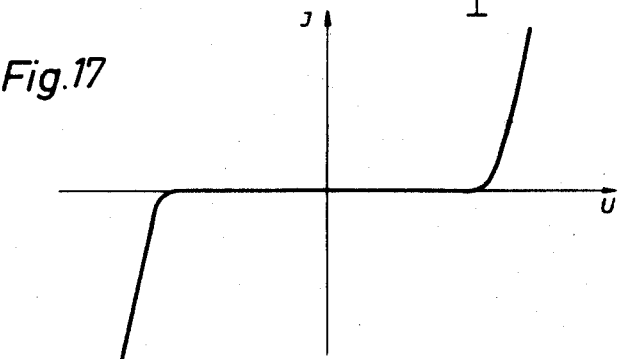
Figure 18:
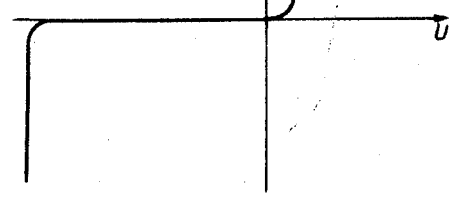

FIGS. 6, 7, and 8 shows the addition of two sinusoidal voltages of different frequency with varying phase relationships;

FIG. 9 shows a frequency discriminator employing the present invention;

FIGS. 10 and 11 show the phase comparison characteristic between two different frequency voltages;

FIG. 12 shows two different phase characteristics for two different directions of frequency deviation;

FIG. 13 shows the voltage form of FIG. 11 after integration;

FIG. 14 shows the voltage form of FIG. 12 after integration;

FIG. 15 shows a voltage dependent resistor used as a polarization independent rectifier;

FIG. 16 shows a circuit for phase and frequency comparison of differently formed voltages;

FIG. 17 shows the response characteristics of oppositely poled zener diodes; and FIG. 18 shows the zener diode response having direct voltage bias displacement.

Figure 1:
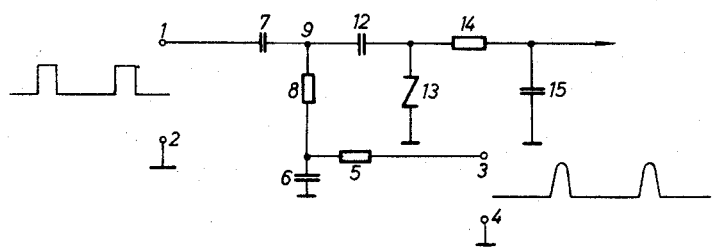
FIG. 1 shows a schematic circuit embodying the invention.
Figure 2:
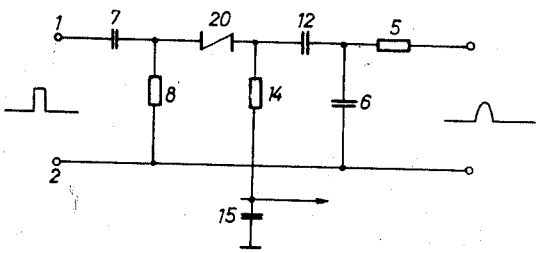
FIG. 2 shows another variation of the novel circuit arrangement.

As a first example of an embodiment of an arrangement for carrying out the method, a phase-comparison circuit, for the synchronization of a horizontal deflecting generator of a television receiver is described with reference to FIG. 1. In the shown circuit arrangement the synchronizing impulse voltage is applied to the terminals 1–2. As is well-known, the likewise pulse-shaped voltage of the horizontal deflecting system is applied to the terminals 3–4. In the example, this voltage is integrated with the resistor 5 and the capacitor 6 (it could just as well be e.g. differentiated). Owing to this integration a sawtoothed-shaped voltage appears at the capacitor 6. With the aid of the capacitor 7 and the resistor 8 the synchronizing impulses are differentiated (just as well they could be e.g. integrated). Accordingly, at point 9 a sum voltage results from both the differentiated sync pulses and the integrated deflecting voltage. This sum voltage is applied to the voltage-dependent resistor 13 via the coupling capacitor 12. The resulting directive voltage is derived by the resistor 14, and is filtered with the aid of the capacitor 15. FIG. 2 shows a modified circuit arrangement, in which the voltage-dependent resistor is arranged between both the differentiated synchronizing voltage and the integrated deflecting voltage, so that the difference voltage of both is applied to this resistor. The circuit elements respectively serve the same purposes as those in FIG. 1 and, therefore, are indicated by the same reference numerals.

Figure 3:
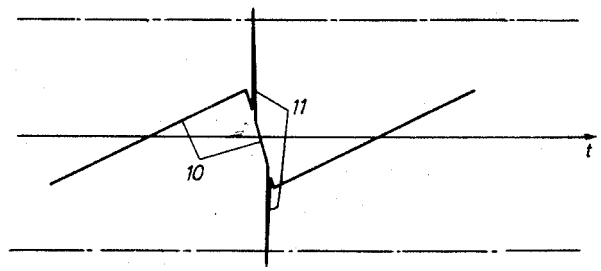
FIG. 3 shows the addition of two voltage pulses.
Figure 4:
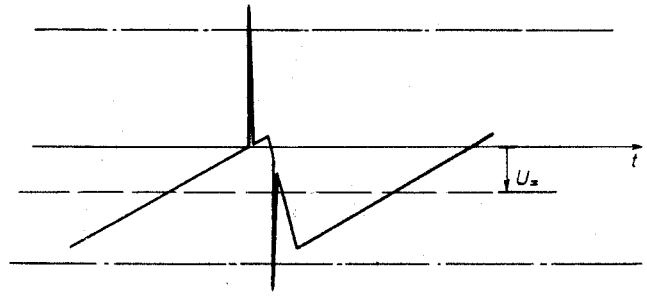
FIG. 4 shows two voltage pulses having an out of phase relation.

FIG. 3 shows the sum voltage. Reference numeral 10 indicates the sawtooth voltage, and the reference numeral 11 indicates the differentiated synchronizing impulse (sync pulse). The phase relation of the two voltages is plotted in the way as wanted or desired. In this case the two peak values, in regard to the mean value which in this drawing coincides with the time base, for example are taken as equal. Accordingly, when applying this voltage to a voltage-dependent resistor, in the same way as if a sinusoidal voltage having known symmetrical portions about a reference level were to be applied, no directive voltage will result. FIG. 4 shows a phase relation in which the synchronizing voltage has a lead or advance. In this case the positive peak value is substantially higher than the negative peak value, both with respect to the mean value. The dot-and-dash lines in the drawings respectively indicate the voltage value from whereon the voltage-dependent resistor noticeably draws current. Since there is established no closed direct-current path, the mean value in relation to time of the current traversing the voltage-dependent resistor must be equal to zero. Accordingly, the voltage appears with such a value at the voltage-dependent resistor that both peak values exceed the respective dot-and-dash line equally far, so that a negative mean value of the voltage will result. This voltage is indicated by the dashed line.

Figure 5:
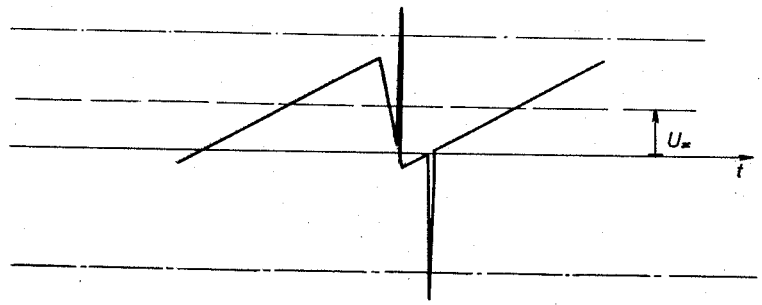
FIG. 5 shows two pulses out of phase in another direction.

FIG. 5 shows the opposite case, in which a positive directive voltage results. It is appropriate to choose the differentiated voltage to be higher than the sawtooth voltage, in order to avoid that the peak values of the sawtooth voltage additionally contribute towards the rectification.

As already mentioned hereinbefore, the directive voltage, in the proper phase position, equals zero. It also equals zero in the absence of synch pulses, in other words, there is involved a symmetrical generation of directive voltage featuring the well-known advantages. This symmetry is achieved in that the two individual voltages have such a shape of curve as a function of time that they alone, without the additional presence of the other, cannot be rectified by a voltage-dependent resistor or any other non-linear and polarization-independent element. In the case of pulse-shaped voltages, as already mentioned hereinbefore, this can be either achieved by an integration or a differentiation.

In the case of a higher frequency, or shorter pulse periods of the pulse-shaped voltages to be compared, it is advisable, in view of the symmetrization, to integrate both voltages, and to form the difference voltage, because at the integration of both voltages the self-capacitance of the voltage-dependent resistor cannot have a disturbing effect, because it is merely added to the capacity of the integration capacitors.

Since an addition of two sinusoidal voltages of the same frequency, just like a subtraction, again results in a sinusoidal voltage, but as sinusoidal voltages do not cause any directive voltage to appear at voltage-dependent resistors, a direct phase comparison of two sinusoidal voltages cannot be effected with the aid of the inventive method. However, this difficulty can be overcome in that one of the two sinusoidal voltages to be compared is subjected to a frequency doubling in a preceding amplifier stage, because a phase comparison between a sinusoidal voltage and a sinusoidal voltage of the double frequency can be easily performed by this method. FIGS. 6, 7 and 8 show the resulting shape or curve of the sum voltage in dependency upon the phase relation of the two voltages with respect to one another.

In this way it is also possible to practically embody a frequency discriminator circuit for sinusoidal voltages. One such circuit arrangement is shown on principle in FIG. 9. Reference numeral 16 indicates a limiter and distorter, which also provides even-numbered harmonics. This device supplies a current which traverses the two circuits 17 and 18. One of the two circuits is tuned to the fundamental wave, and the second circuit is tuned to double the frequency. It adds to the increase of the steepness (transconductance) and linearity of the resulting discriminator curve, when chosing the quality (Q-factor) of the fundamental wave circuit to be substantially higher than the quality (Q-factor) of the harmonic oscillation circuit.

Such an arrangement can be used for obtaining a readjusting voltage, as well as for demodulating a frequency-modulated signal.

As has been provide by intensive experiments and theoretical considerations, the inventive method is not only suitable for effecting a phase comparison, but is additionally suitable for performing the frequency comparison between two alternating voltages.

According to the invention this is accomplished in that the difference-frequency phase-dependent alternating voltage as resulting in the case of a non-coinciding frequency of the two voltages to be compared, and whose alternating-voltage polarity is a function of the direction of detuning, is used for obtaining a frequency-dependent control voltage, whose direct-voltage polarity likewise is a function of the direction of detuning.

The inventive method, when used for synchronizing an oscillator with the aid of one synchronizing signal, has the following advantages: very large pull-in range, very good noise-suppression, symmetrical phase comparison, and symmetrical frequency comparison. Accordingly, the inventive method has all the advantages which also feature the circuit arrangement known as "Quadricorrelator" (see Proceedings of the Institute of Radio Engineers, January 1954, pp. 106 to 133).

Unlike this conventional circuit arrangement, which is only suitable for sinusoidal voltages, the inventive method has the advantage of being suitable for pulse-shaped voltages and, after the conversion of sinusoidal voltages into pulse-shaped voltages, also for sinusoidal voltages. in contradistinction to the "Quadricorrelator," the inventive method can be used advantageously for the synchronization of deflecting generators. In addition thereto, the inventive arrangements are made in a substantially more simple technical construction, and are not as expensive as the conventional arrangement. Besides the economical advantages, the inventive method also features additional noise-suppressing properties.

The phase-comparison characteristic of a phase-comparison circuit (phase-comparator) which is needed for explaining the mode of operation of the inventive method, is generally defined by the following function: control voltage is dependent upon the phase difference of the two voltages to be compared. A typical phase-comparison characteristic of a phase comparator for synchronizing the horizontal deflection in television receivers is shown in FIG. 10. In cases where no agreement (or coincidence) is established between the frequencies of the two voltages to be compared, the phase permanently runs at the angular velocity $\omega$, which corresponds to the difference frequency. Accordingly, the output voltage in front of the control-voltage filter circuits, quite depending on the driection of the frequency deviation, has the shape as plotted in FIGS. 11 or 12. As will be seen, the alternating-voltage polarity of the difference-frequency voltage depends on the direction of the frequency deviation. The first step in the inventive method consists in converting the difference-frequency voltage in such a way that it will assume such a shape of curve as a function of time, that the voltage-peak value of the one polarity becomes substantially higher than the voltage-peak value of the other polarity with respect to the mean value. For example, if the voltage, as plotted in FIG. 11, is integrated, then a voltage will be obtained as is plotted in FIG. 13. The positive peak value of this voltage is substantially higher than the negative one. However, if the voltage is integrated, as is plotted in FIG. 12, then a voltage as plotted in FIG. 14 will be obtained. In case the phase-comparison characteristic does not have the shape of curve as shown in FIG. 10, but is of the sawtooth type, then the conversion by differentiation is to be preferred. The thus converted difference-frequency voltage is now fed to a rectifier arrrangement by which the positive as well as the negative peak value is rectified, and the thus obtained positive and negative direct voltage is superimposed in such a way that the total direct voltage with its polarity depends on the direction of detuning. The rectifier arrangement, by way of example, may consist of two diodes. However, it is also possible to use as a rectifier arrangement a further non-linear and polarization-independent element, such as a voltage-dependent resistor. A corresponding example is shown in FIG. 15.

When applying the thus converted voltage to the terminals 1 and 2, then the coupling capacitor 3 will feed this voltage to the voltage-dependent resistor 4, which limits the voltage on both sides. The direct-current component is taken from the resistor 5, and is filtered by the capacitor 6. As a rule, only one readjusting device or equipment is supposed to be used; for this reason this frequency-dependent control voltage has to be added to the phase-dependent control voltage resulting from the phase comparator.

Another way of conversion, in contra-distinction to the integration or differentiation, and in which a supplementary rectification may be omitted, because the voltage immediately results with its direct-voltage component, may be seen in the employment of a binary storage device which stores the polarity of the peak value of the difference-frequency voltage that occurred last. One of the most well-known circuit arrangements of this type is the bistable multivibrator. The employment of storage devices with an unrestricted storage time, to which also the bistable multivibrator belongs, is advisable in the case of circuit arrangements in which the phase-pull-in range is very narrow. The term "phase-pull-in range" refers to the pull-in range of the phase comparator without the application of the frequency comparison, hence to the pull-in range which is dependent upon the filtering, as distinguished from the new pull-in range substantially enlarged by the additional application of the frequency comparison, and which is not dependent upon the filtering, and is hereinafter referred to as the frequency-pull-in range. It might also be very useful to employ such storage devices with an unrestricted storage time in the case of very low frequencies (e.g. below 1 kc./s.). In the case of higher frequencies, for example, of the horizontal deflecting frequency for television receivers (15.625 kc./s.) the use of storage devices with a restricted storage time is more favourable, because when using such storage devices the frequency-comparison control voltage, after having established the synchronization, becomes zero, so that the same phase position is achieved, independently of whether the synchronization is effected by the lower or the higher frequency.

A further feature according to the invention consists in dimensioning the phase comparator in such a way that this circuit arrangement itself acts as an additional binary storage device, so that no additional arrangements are required. This is accomplished by combining the following properties:

(1) By employing a coincidence circuit it is ensured that a current will only traverse the non-linear element during a small portion of the period of the difference-frequency voltage.

(2) The time-constant of charging the capacitors of a rectifier circuit by the rectifying current of the non-linear element must be very small with respect to the time-constant of the discharge of the charging capacitors, so that the charging capacitors in that particular portion or range of the period of the difference-frequency voltage, which is blocked by the coincidence circuit, will store that particular voltage which they have built up by the time of reaching the end of the non-blocked portion of the period.

(3) The time-constant of discharge of the charging capacitors must be so great that the storing capacity will not be sacrificed at the limiting or cutoff frequency of the phase-pull-in range. For example, if the phase-pull-in range amounts to ±100 c./s., then the lowest appearing difference frequency is 100 c./s. (the limiting or cutoff frequency of the phase-pull-in range). Accordingly, the period lasts 10 ms. Consequently, the discharge time-constant has to be so great that the mean value in relation to time, of the voltage converted by the storing, is still so high that this frequency-dependent control voltage is still capable of detuning the oscillator up into the phase-pull-in range. Accordingly, its necessary minimum value is dependent upon the magnitude of the comparison (reference) voltages, on the magnitude of the necessary retuning voltage, and on the limiting or cutoff frequency of the phase-pull-in range.

As a rule the time-constant of discharge of the charging capacitor or of the charging capacitors of a rectifier circuit depends on the value of the sum capacity of the charging capacitors, on the value of the back resistance of the rectifier, and on the value of the filtering resistance, which leads to the filter capacitor. Accordingly, by requiring a great discharge time-constant, it is demanded that an unusual or exceptionally high filter resistance is used, and that the back resistance of the rectifier, in this particular case the back resistance of the non-linear element, is very high. The capacity of the charging capacitor or capacitors cannot be enlarged at will, because at the same time a small charging time-constant is required.

Now as before, the two pass ranges of the characteristic have to be approximately equal, hence have to show a similar behaviour with respect to both directions of polarization of the applied alternating voltages. In other words: it has to be a non-linear and polarization-independent element with a high back resistance. For example, symmetrical gas-discharge gaps, such as gas-discharge gaps with an approximately equal negative and positive inclination (slope) in both pass ranges, germanium or silicon diodes with a steep declination of the characteristic subsequently to exceeding the suppression band or range, for example, Zener-diodes. Since only alternating voltages are applied to the element it is a self-suggesting matter of fact that the polarization independence only refers to alternating voltages. A direct-voltage displacement of the total characteristic (as is the case with the Zener-diode), would actually be admissible, because it, if necessary, can be compensated by an additional fixed biasing potential.

Examples of the characteristics are shown in FIGS. 17 and 18. As an ordinate the current J, and as an abscissa the voltage U is plotted. The inclination of the characteristic of the two pass ranges is substantially equal owing to the polarization independence of the element with respect to alternating voltages (e.g. of the element 28 in FIG. 16). A direct-voltage displacement, as is shown in FIG. 18, is admissible in some cases, but can be compensated, if so required, by a biasing potential. However, preference is only given to one characteristic, e.g. as is shown in FIG. 17. Such a characteristic can be achieved, e.g. by an oppositely polarized series-connection of two Zener-diodes.

As a coincidence circuit it is possible to use any suitable type of such circuit arrangement known per se. However, it is of a particular advantage, in accordance with the invention, to design the phase-comparsion circuit, by paying attention to three further conditions, in such a way that the circuit arrangement itself additionally acts as a coincidence circuit. This possibility will result when utilizing the blocking voltage, if both alternating voltages to be compared consist of double-impulse voltages which have almost equal positive and negative peak values, as well as being almost equal to each other, and if the voltage value from peak to peak of each of the individual voltages is lying between 50 and 100 percent, preferably at 75 percent, of the size of the suppression band or range of the non-linear element. It can also be achieved by this measure that a current traverses the non-linear element only during a small portion of the period of the difference-frequency voltage.

The impulse periods of the double impulses of the two double-impulse voltages, for the purpose of producing a suitable directive voltage, are chosen thus, that the impulse period of one double-impulse voltage is substantially longer than that of the other one. Preferably, the impulse periods of the double impulses of the two double-impulse voltages should substantially behave like in the ratio of 1:2.

In the case of pulse-shaped voltages, as customary in the fields of television engineering, it is relatively easy to produce a double-impulse voltage. It is derived from the differentiation of the impulse voltage. In cases where sinusoidal voltages are supposed to be compared, they are first converted into impulse voltages by means of an overdriving of the last amplifier stage.

Normally an RC-circuit connected as high-pass filter is used as a differentiating circuit. In another method known per se, a highly attenuated oscillating circuit is used for the differentiating purpose. The employment of an attenuated oscillating circuit for differentiating the received synchronizing signal, in this particular case, offers the added advantage that the frequency-pull-in range almost retains its normal size also in the case of highly noise-affected signals. The reason for this may be seen in the fact that a highly attenuated oscillating circuit, despite the attenuation, still has a substantially smaller frequency-pass range than an RC-circuit connected as a high-pass filter. In this way the storage property of the circuit arrangement is prevented from being reduced by having the rectifier element opened by the action of noise pulses or noise voltages.

For practically obtaining a large frequency-pull-in range both the suppression band or range of the element and the alternating voltages to be compared are chosen so large or high respectively, that the resulting frequency-dependent control voltage is sufficient for modulating the successively following readjusting stage. In addition, this effects a substantial increase of the control sensitivity. The term "control sensitivity" refers to the relationship between the frequency difference appearing in the case of a frequency leap, and the phase difference which is caused thereby, and which is necessary for maintaining the synchronization. The substantial increase of the control sensitivity has the advantage which is very important to an automatic circuit arrangement, that even in the case of very considerable frequency deviations the resulting phase deviation is only a very small one.

The phase-dependent control voltage is compulsorily higher than the frequency-dependent control voltage. This has the advantage that the hold range likewise never becomes smaller than the frequency-pull-in range, so that a swinging between pulling-in and falling-out will always be impossible.

A circuit arrangement according to the invention for producing a phase- and frequency-dependent control voltage is schematically shown in FIG. 16. The drawing only contains those parts which are absolutely necessary for enabling a better understanding of the invention. The one of the two double-impulse voltages is derived via the oscillating circuit 29, which consists of the inductance 23 and of the capacitor 24, from the pulse-shaped anode current of the tube 25. This double-impulse voltage is fed via the coupling capacitor 7 to the one terminal of the non-linear and polarization-independent element 28 having a high back resistance. The resistor 8 not only serves as a leakage resistance, but also as an attenuating resistance for the oscillating circuit 29. To the terminal 1 the impulse-shaped reference voltage is applied, which is converted into a double-impulse voltage with the aid of both the capacitor 27 and the resistor 26. Via the coupling capacitor 30, which simultaneously serves as a storage capacitor, this double-impulse voltage is fed to the other terminal of the element 28. The obtained control voltage is taken off by the filter resistor 14, and its high-frequency alternating-voltage component is suppressed by the filter capacitor. The double-impulse voltage appearing at the resistor 26 has about double the impulse period than the double-impulse voltage appearing at the resistor 8.

Disregarding the noise-suppressing property of the control voltage filtering, and disregarding the coinciding property of the circuit arrangement, it still has an additional noise-suppressing effect, which is due to the storing property.

From the fields of television receivers it is known that very strong noise impulses are capable of causing in the amplitude filter such strong and momentary grid currents, that the grid coupling capacitor is charged in a strongly negative way, so that for a relative long period of time (up to some ms.) synchronizing impulses are prevented from leaving the amplitude filter.

Simple types of phase-comparison circuits deliver in the absence of synchronizing impulses (sync pulses) a zero-volt control voltage to the filter circuit. If the manual readjusting device is set in such a way that the control voltage in any case amounts to zero volt, then the absence of the impulses will hardly have a disturbing effect. In the case of a deviation from this mid-position, however, quite depending on the direction of deviation, considerable displacements of whole groups of lines towards the right or the left appear on the picture screen as a result of temporarily missing synchronizing pulses. Since in the case of automatic circuit arrangements it is impossible to effect a manual returning, this kind of disturbance is particularly disagreeable. Up to now it was only possible to remove these disturbances with the aid of noise-blanking circuits, hence at a considerable additional expense. The novel method described hereinbefore, has the additional ability of suppressing such kinds of interferences. In contradistinction to the simple types of phase-comparison circuits, the circuit arrangement according to the invention, at a temporary absence of the synchronizing impulses, not only provides a zero-volt control voltage, but continuously provides the same control voltage owing to its inherent storage property, in other words, it provides the same control voltage as prior to the failing of the impulses, because in the absence of synchronizing impulses no current can flow through the non-linear element, so that a potential variation is rendered impossible.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A circuit arrangement for producing a direct voltage as a function of the phase difference between two A.C. voltages comprising means supplying first and second A.C. voltages, means combining said two A.C. voltages to produce a resultant voltage having opposite polarity peak values which are dependent upon the phase difference of the two A.C. voltages, and a polarization-independent bi-directional rectifier means symmetrically responsive to said opposite polarities of said resultant voltage and producing a direct voltage having an amplitude and polarity dependent upon the phase difference between said two A.C. voltages.

2. A circuit arrangement according to claim 1 wherein said polarization-independent rectifier means comprises a bi-directional pair of series connected zener diodes connected to said combining means.

3. A circuit arrangement according to claim 1 wherein said A.C. voltages are substantially sinusoidal and including means supplying one said voltage which is double the frequency of the other.

4. The device of claim 3 including resistor-capacitor coupling means connecting said A.C. voltages to said rectifying means, said coupling means providing a relatively short charging time and long discharging time constant to permit signal storage during non-conduction of said rectifier means.

5. A circuit arrangement according to claim 4 wherein opposite polarity peaks of each of said A.C. voltages are of substantially equal magnitude.

6. A circuit arrangement for producing a direct voltage as a function of the phase difference between two A.C. voltages comprising an integrating circuit responsive to one of said A.C. voltages, a differentiating circuit responsive to the other of said A.C. voltages, means coupling said integrating circuit and said differentiating circuit to produce a resultant voltage having peak values of opposite polarity which are dependent upon the phase difference of the two A.C. voltages, and a polarization-independent rectifier means symmetrically responsive to said opposite polarities of said resultant voltage for producing a direct voltage having an amplitude and polarity dependent upon the phase difference between said two A.C. voltages.

7. A circuit arrangement according to claim 6 wherein said polarization-independent rectifier means comprises a bidirectional pair of series connected zener diodes connected to said combining means.

References Cited by the Examiner

UNITED STATES PATENTS

| | | | |
|---|---|---|---|
| 2,427,366 | 9/47 | Mozley et al. | 324—89 |
| 2,428,180 | 9/47 | Scherbatskoy | 324—89 |
| 2,684,443 | 7/54 | Tidball | 328—133 |
| 2,706,274 | 4/55 | Boyer | 328—134 |
| 2,751,555 | 6/56 | Kirkpatrick | 328—134 |
| 2,923,884 | 2/60 | Moss | 328—133 |
| 2,933,624 | 4/60 | Pollack | 307—88.5 |
| 2,988,695 | 6/61 | Leavitt | 324—89 |
| 3,012,201 | 12/61 | Morphett | 328—133 |
| 3,039,059 | 6/62 | Fisher | 328—133 |

FOREIGN PATENTS 637,597  5/50  Great Britain.

LLOYD McCOLLUM, *Primary Examiner.*

HERMAN K. SAALBACH, SAMUEL BERNSTEIN,
*Examiners.*